Nov. 10, 1953
C. E. ROYAL
2,658,439
AIR CONDITIONING OF PARKED VEHICLES
Filed May 20, 1948
2 Sheets-Sheet 1
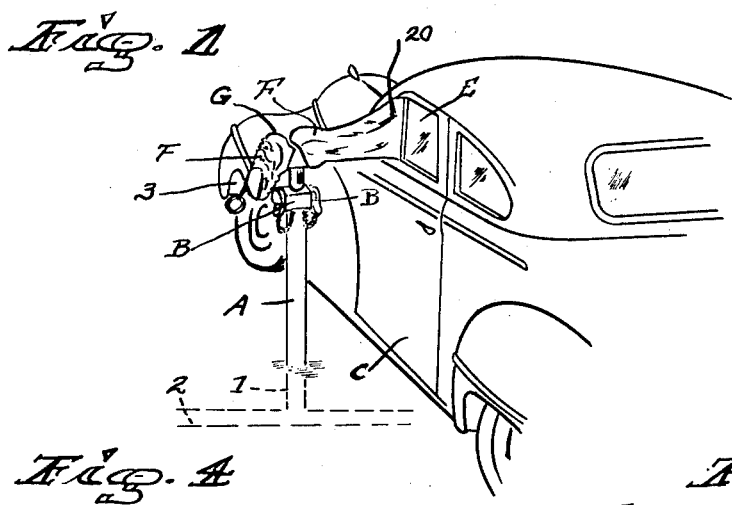
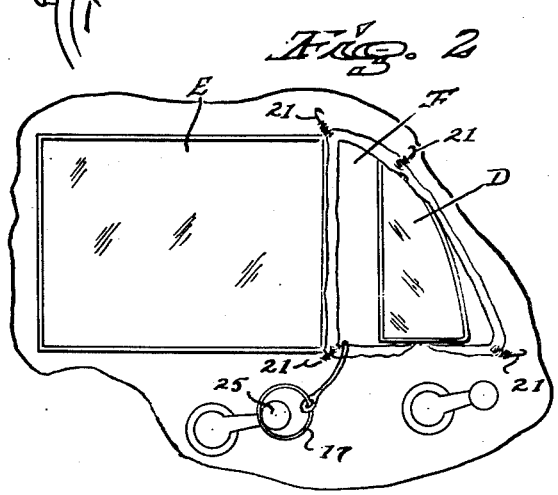
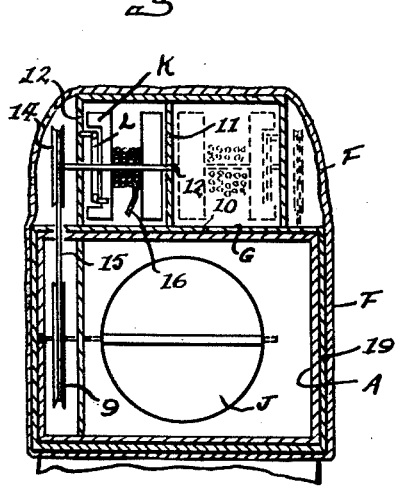
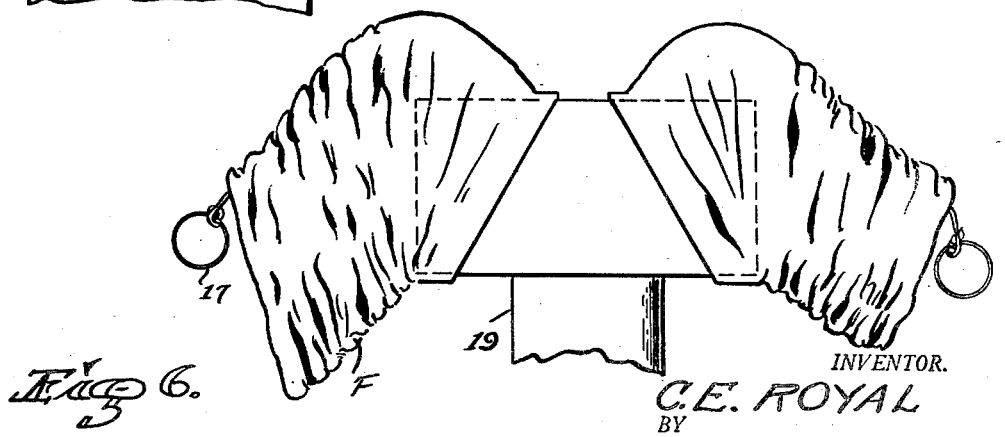
INVENTOR.
C. E. ROYAL
BY
Pattison, Wright & Pattison
ATTORNEYS Nov. 10, 1953

C. E. ROYAL 2,658,439

AIR CONDITIONING OF PARKED VEHICLES

Filed May 20, 1948

INVENTOR.
C. E. ROYAL
BY
Pattison, Wright & Pattison
ATTORNEYS

Patented Nov. 10, 1953

2,658,439

UNITED STATES PATENT OFFICE 2,658,439

AIR CONDITIONING OF PARKED VEHICLES

Charles E. Royal, Lockhart, Tex.

Application May 20, 1948, Serial No. 28,114

4 Claims. (Cl. 98—2)

1

The present invention pertains to the air conditioning of the interior of a parked vehicle particularly the closed type of passenger automobile. The foregoing expression is intended to include either the heating or cooling of the interior of the vehicle.

The invention has utility in a number of ways, one instance, and one illustrated in the drawings and selected to be specifically described, being either the heating or cooling of the interior of a vehicle which is parked in what is commonly referred to as a drive-in theater at which the vehicles are parked out-of-doors to view a play or screen on a stage which is visible to all of the patrons in the numerous parked cars. Obviously heating of the car would be provided during the cold seasons and the cooling of the car during the hot seasons.

Another use of the invention but one which is not illustrated or specifically described would be the provision of the heating or cooling system on any parking area as for instance the parking area adjacent that type of restaurant where car service is provided by bringing the meal to the car for consumption by the customers who remain in the car.

Other different and specific uses of the invention will occur to those who familiarize themselves with the nature of the invention by study of the following description in conjunction with the accompanying drawings.

The primary object of the invention is the provision of a novel, simple and efficient arrangement for air conditioning the interior of a parked closed vehicle.

A further object of the invention is the provision of a device of the character described which lends itself particularly for combination with the equipment ordinarily and usually found in a drive-in type of theater.

A still further object of the invention is the provision of a device of the character described wherein a novel, simple and quickly operable arrangement is provided for attachment of the invention to the vehicle to air condition the interior thereof and in which the attachment of the device to the vehicle automatically opens a valve or similar arrangement to permit delivery of the air conditioning medium and detachment of the device from the vehicle automatically closes the valve or other device to prevent free escape of the air conditioning medium.

Other objects of the invention will appear from the following description as will the novelty of the invention and the advantages derived by the practice of the invention.

2

Referring to the drawings in which the application of the inventive concept to the equipment of a drive-in theater is illustrated:

Fig. 1 is a perspective view illustrating the invention in operation.

Fig. 2 is a fragmentary view of the interior of a vehicle illustrating the manner of attachment of the invention thereto.

Fig. 4 is a vertical section on the line 4—4 of Fig. 3.

Fig. 6 is a perspective view illustrating the appearance of the invention when not in actual use.

Figure 3:
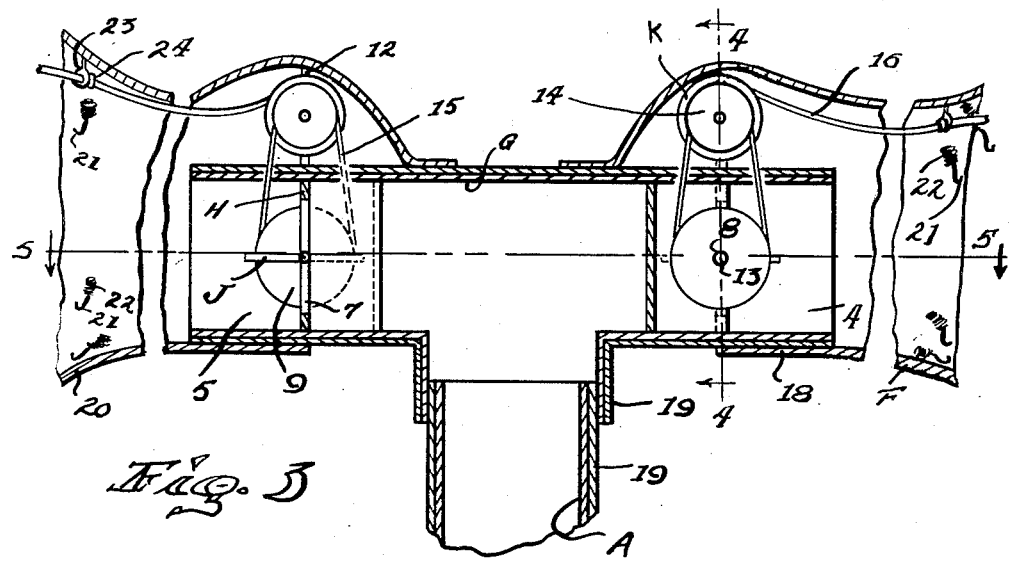
Fig. 3 is a longitudinal vertical section.
Figure 5:
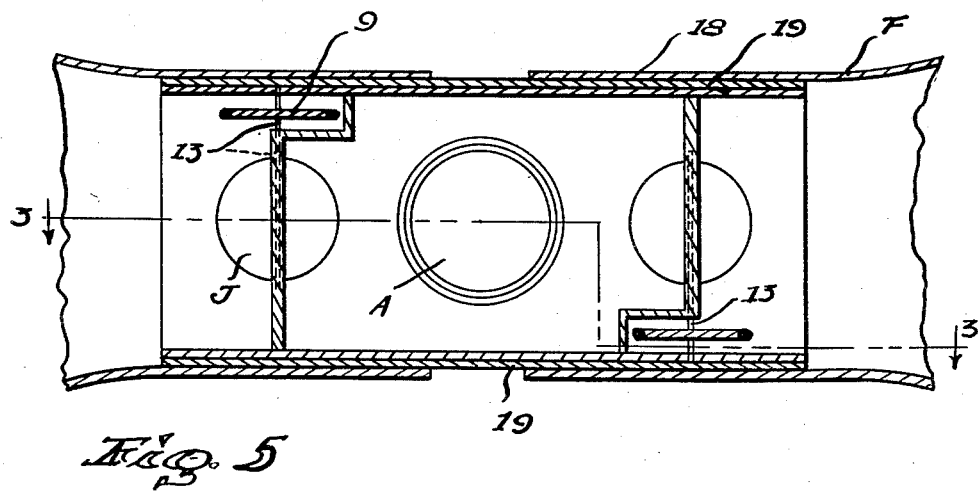
Fig. 5 is a longitudinal horizontal sectional view.

The set-up and arrangement of a drive-in theater is generally well known and specific description thereof is unnecessary other than to say that throughout the parking area into which the vehicles are driven are a plurality of hollow vertically extending posts A. A moving picture type of drive-in theater has been selected for illustration and in these it is intended that a vehicle drive up and park on the opposite sides of the posts with the front ends of the vehicles facing the screen. It is common practice therefore to have suspended on opposite sides of the posts speaker or sound equipment or devices designated generally at B. This equipment includes wiring which is flexible in nature and of considerable length so that the sound apparatus can be lifted from the post and brought into the car through a window thereof. If, as may possibly be the case, the theater is not arranged as described then for the practice of the present invention hollow posts A would be provided.

A system of conduits would be arranged beneath the ground in the parking area and would extend to and receive from a suitable source of supply (not shown) either cooled or heated air, whichever is desired, and each of the posts would be connected to this system by having the lower ends 1 of the posts communicate with one of the conduits 2 of the system.

In the drawings the vehicle C is a closed type passenger automobile provided with the conventional ventilating window D which is comparatively small in size and is positioned in front of the main front side window E. These windows D are mounted upon a vertical pivot so that when operated they swing from open to closed positions and may be readily adjusted to only partially open the aperture in which they are mounted. Ventilating windows of the type described are common and conventional in automobiles as built today but the invention is not limited to use with such windows as the invention can be adapted to windows of greater size, as for instance one of the main side windows of the vehicle, by merely changing the dimensions of the flexible conduit F which delivers the air conditioning medium to the car.

The foregoing description will enable full understanding and evaluation of the invention from the following specific description of the details of construction comprising the device.

A T-shaped box G is attached to the upper end of each of the speaker or other posts A to provide oppositely extending open ended exhaust conduits or passageways 4 and 5. A plate H having an off-set 6 extends transverse each of the exhaust conduits and is provided with a passageway 7 which is normally closed by a valve J, of the butterfly or other suitable type, which is horizontally pivotally mounted as at 8 and carries on one of its ends and within the off-set of the plate H a pulley wheel 9.

Above the top 10 of the box and adjacent each end thereof a reel K is rotatably supported between vertical standards 11 and 12. The shaft 13 of the reel extends through the standard 12 and is provided with a pulley wheel 14. An endless belt or cable 15 is trained over the pulleys 9 and 14. A cable 16 has one end secured to the reel and a free end carrying a ring 17 the purpose of which will hereinafter appear. A spring L has one end secured to the reel and the other to the standard 12 and tends to keep the reel in a reeled in position by reason of which the valve J is normally held in a closed position in respect to the passageway 7.

A flexible conduit F is provided for each of the exhaust passageways 4 and 5. One end 18 of this conduit telescopically receives the exhaust conduit of the box and covers the reel K and its associated pulley wheel 14. The posts A and the boxes G thereof are covered with some suitable insulating material 19. The ends 18 of the flexible conduits are suitably secured to the insulating covering of the box exhaust conduits such as by an adhesive or some other suitable securing medium.

The flexible conduits are of considerable length and have an open outer flared end 20 which is of a size at least as great as the aperture covered by the car ventilating window D. At their enlarged ends 20 the conduits circumferentially and in spaced relationship are provided with hooks 21 having in their connections with the conduit resilient elements such as springs 22. Interior of the flared ends of the conduits they are provided with an eye 23 through which is threaded the cable 16. At a point interior of the eye the cable is provided with an enlargement 24 constituting a stop to the outward movement of the cable through the eye. The aforementioned ring 17 is on the outer end of the cable.

When the apparatus is not in use the reel K being in a reeled position by reason of the spring L closes the valve J and reels in the cable 16. As the cable is reeled in the ring 17 contacts the eye 23 and holds the flexible conduit F in a collapsed condition against the box as clearly appears in Fig. 6 of the drawings. When the apparatus is in use a car is positioned as illustrated in Fig. 1. The driver reaches out and grasps the ring 17 and pulls it through the aperture of the ventilating window D and secures the ring over the main window operating handle 25. The hooks 21 are secured in the upholstery of the car, as clearly illustrated in Fig. 2, and in this manner the enlarged end of the flexible conduit is secured tightly to the vehicle and closes the window aperture. As the flexible conduit is pulled to the vehicle and secured thereto the reel K is unwound against the spring tension which results in the opening of the valve J and also causes the enlarged end of the conduit to be brought to the car window by reason of the cable stop 24 engaging the conduit eye 23. Under these conditions the valve J is completely open for the transmission of the air conditioning medium into the car through the window aperture. Control of the amount of air conditioning medium delivered into the vehicle is obtained by manipulating the ventilating window D in any position from a fully opened to an approximately closed position. When the vehicle is ready to depart the hooks 21 are released from the upholstery and the ring 17 removed from the window handle 25. Release by the car operator of the ring 17 will carry the flexible conduit back into the position illustrated in Fig. 6 due to the spring L which returns the reel to a reeled in position. Simultaneously the valve J is closed to prevent the free escape of the air conditioning medium from the conduit system.

Where the invention is utilized in drive-in moving picture theaters slight modification of the construction illustrated might be necessary but these could be made without departure from the inventive concept. In some speaker installations the junction box for the speaker is positioned squarely on top of the post and in these instances a by-pass continuation of the post could be provided around the junction box. However if this were not practical or desirable a hollow post could be provided immediately in front of the post carrying the speaker.

From the foregoing it will be seen that a convenient, simple and practical arrangement is provided for heating or cooling of a parked car and that the invention is susceptible of usage in any vehicle parking area where the passengers, for any reason, remain in the parked car for any appreciable length of time.

Departures from the specific arrangement illustrated and described can be made without departing from the inventive concept and the invention therefore is to be limited only by the terms of the following claims.

What I claim is:

1. The combination comprising, a vehicle parking area, a system of conduits for conveying an air conditioning medium, said system including hollow posts extending vertically above the level of the parking area, a flexible conduit carried by the post and forming a continuation thereof, said flexible conduit having an open end attachable to a vehicle to close an open window opening thereof, a valve normally closing communication between the post and the flexible conduit, a rotatable reel operatively connected to the valve for moving the valve to an open position, resilient means holding the valve in a closed position, a cable connected to said reel for rotation thereof and to the flexible conduit, said cable constituting means by which the flexible conduit can be manually moved for attachment to the vehicle, and the movement of said flexible conduit for attachment to the vehicle resulting in the rotation of said reel and the opening of said valve.

2. The combination comprising, a parking area such as that in a drive-in type of theatre, a plurality of hollow vertically disposed posts arranged in spaced relationship and extending above said parking area, a system of conduits connected to said posts for supplying an air conditioning medium thereto, each of said posts provided with a flexible conduit constituting a continuation of the post formed conduit, a valve normally closing communication between the post conduit and the flexing conduit, said valve being rotatably mounted, a reel, a cable wound about the reel, operative connection between said reel and said valve, means connected to and resiliently urging said reel to a reeled position with the cable retracted and wound about the reel, said reel when in a reeled position holding the valve in its said closed position, the cable being connected to the flexible conduit and provided with a hand hold element, said hand hold element constituting means for moving the flexible conduit to a vehicle for attachment at a window of the vehicle, means for attaching the flexible conduit to a window of a vehicle, and the movement of said flexible conduit to the vehicle for attachment thereto resulting in the unreeling of the reel and the opening of the valve.

3. The combination defined in claim 2 wherein, the window of the vehicle is movable from an opened to a closed position, and the position of said window constituting means for controlling the amount of air conditioning medium discharged from the flexible conduit into the vehicle.

4. The combination defined in claim 2 wherein, the vehicle is provided with a window movable about a vertical pivot for movement from an open to a closed position, the flexible conduit being connected to and closing said window, and means to move said window for controlling the amount of air conditioning medium discharged from the flexible conduit into the vehicle and selectively directing the air conditioning medium toward the front or rear of the vehicle.

CHARLES E. ROYAL.

References Cited in the file of this patent

UNITED STATES PATENTS

| Number | Name | Date |
|---|---|---|
| 940,590 | Gay | Nov. 16, 1909 |
| 984,553 | Gay | Feb. 21, 1911 |
| 1,678,748 | Smith | July 31, 1928 |
| 2,085,470 | Pieper | June 29, 1937 |
| 2,091,594 | Innes | Aug. 31, 1937 |
| 2,124,925 | McNeal | July 26, 1938 |
| 2,469,986 | Phyfe | May 10, 1949 |
| 2,529,425 | Sharp | Nov. 7, 1950 |

OTHER REFERENCES

"Air Conditioned Drive-In Theaters," article by Carl F. Boester, Heating and Ventilating Magazine, July 1949, pages 57–58. (Copy in Div. 49.)